(12) United States Patent
Legl et al.

(10) Patent No.: US 8,315,858 B1
(45) Date of Patent: Nov. 20, 2012

(54) METHOD FOR DIGITALLY RECORDING AN ANALOG AUDIO SIGNAL WITH AUTOMATIC INDEXING

(76) Inventors: Christian Legl, Grobenzell (DE); Michael Hermann, Muhldorf (DE)

(\*) Notice: Subject to any disclaimer, the term of this patent is extended or adjusted under 35 U.S.C. 154(b) by 2030 days.

(21) Appl. No.: 10/031,471

(22) PCT Filed: Jul. 13, 2000

(86) PCT No.: PCT/DE00/02294
§ 371 (c)(1),
(2), (4) Date: Jun. 3, 2002

(87) PCT Pub. No.: WO01/06488
PCT Pub. Date: Jan. 25, 2001

(30) Foreign Application Priority Data

Jul. 16, 1999 (DE) .................................. 199 33 541

(51) Int. Cl.
*G10L 11/06* (2006.01)
(52) U.S. Cl. ........................................ 704/214; 704/215
(58) Field of Classification Search .......... 704/207–210, 704/213–215; 341/108, 110, 122–172; 360/5–8, 360/13, 15, 32, 55–58, 69, 71, 73.01; 706/927, 706/934
See application file for complete search history.

(56) References Cited

U.S. PATENT DOCUMENTS

| | | | | |
|---|---|---|---|---|
| 4,336,421 A * | 6/1982 | Welch et al. | .................. | 704/243 |
| 4,355,338 A * | 10/1982 | Yamamoto et al. | ............. | 360/15 |
| 4,696,031 A * | 9/1987 | Freudberg et al. | ............ | 379/386 |
| 4,916,742 A * | 4/1990 | Kolesnikov et al. | .......... | 704/215 |
| 5,293,273 A | 3/1994 | Glick | ................ | 360/5 |
| 5,526,407 A * | 6/1996 | Russell et al. | ............. | 379/88.01 |
| 5,625,359 A * | 4/1997 | Wilson et al. | ................. | 341/143 |
| 5,659,662 A | 8/1997 | Wilcox et al. | ............... | 395/2.54 |
| 2001/0010037 A1 * | 7/2001 | Imai et al. | .................... | 704/210 |

OTHER PUBLICATIONS

Gan et al., "Implementation of Silence Compression Scheme for G.723.1 Speech Coder Using TI TMS320S75 DSP Chip", 1997.*

* cited by examiner

*Primary Examiner* — Shirley Zhang
(74) *Attorney, Agent, or Firm* — Slater & Matsil, L.L.P.

(57) ABSTRACT

A method for digitally recording an analog audio signal with automatic indexing, having the following steps: (a) an analog audio signal containing audio information and signal pauses is read in, (b) the analog audio signal is converted into digital audio data comprising audio information data and signal pause duration data, (c) the audio information data are stored as information data blocks and the signal pause duration data are stored as signal pause data blocks in a memory, (d) the stored data blocks are read sequentially and an index table is produced, any succession of information data blocks which is not interrupted by a signal pause with a predetermined duration being detected as one cohesive audio information data sequence whose start and end are stored in the index table.

30 Claims, 3 Drawing Sheets

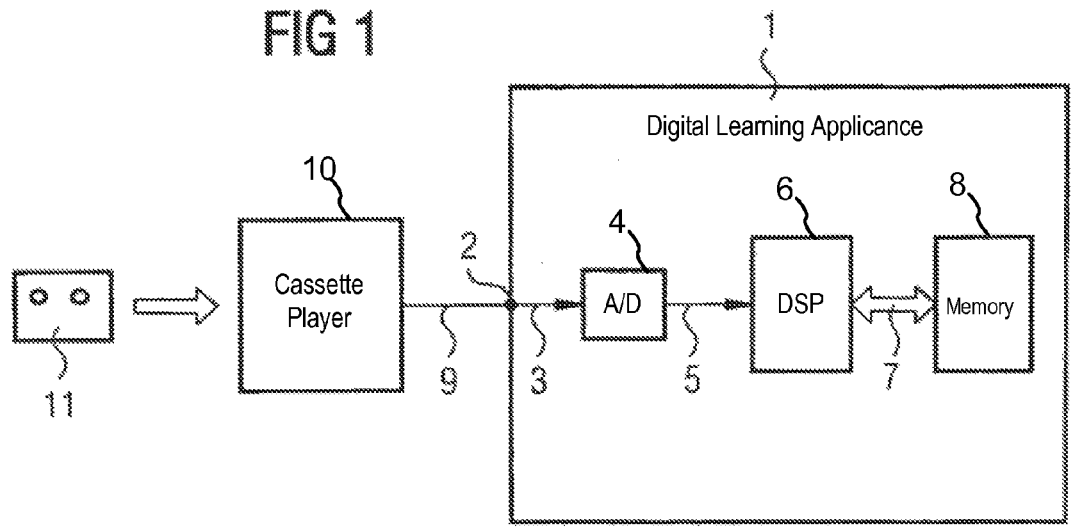

METHOD FOR DIGITALLY RECORDING AN ANALOG AUDIO SIGNAL WITH AUTOMATIC INDEXING

FIELD OF INVENTION

The invention relates to a method for digitally recording an analog audio signal with automatic indexing, in particular for language learning appliances for learning foreign languages.

BACKGROUND

In language learning machines, a spoken phrase or voice sequence is first played, which is a single word or a whole sentence, for example. The person who is learning then repeats this played spoken phrase, which is received by the learning appliance through a microphone and is recorded. By alternately playing back the original spoken phrase and the repeated spoken phrase, the person who is learning can check whether he has repeated the spoken phrase correctly.

Currently, analog learning appliances are used, in which the spoken phrases are stored on analog cassettes. To this end, the analog learning appliances have cassette drives for inserting the analog cassettes. The cassette drive required for inserting the analog cassettes means that such analog learning appliances cannot be miniaturized as desired. In addition, the drive mechanism of the cassette drive requires a large amount of power, which means that inserted batteries do not last very long, i.e. their standby time is considerably shortened. In addition, the cassette drive is subject to mechanical wear phenomena, which means that the analog learning appliances are prone to needing repair, or losses of quality arise.

By contrast, digital learning appliances afford the advantage that the spoken phrases are stored in digital memories, which means that no drive is required for inserting analog cassettes. Accordingly, inserted batteries last longer, the appliances are less prone to needing repair, and the quality of the spoken phrases is constant, since there are no mechanical parts which are subject to wear. To date, a great many analog learning cassettes for a wide variety of foreign languages have been recorded for analog learning appliances. Many customers already possess an extensive collection of analog learning cassettes with a wide variety of contents. To be able to render the contents of the already recorded analog learning cassettes useful for the digital learning appliances, the content of the analog learning cassettes needs to be recorded digitally by the digital learning appliance.

SUMMARY

So that the person who is learning can access the various spoken phrases for learning quickly and with random access when using the digital learning appliance, an index needs to be produced for each spoken phrase. This spoken phrase index permits access to the associated spoken phrase, with the index storing the start and the end or the start and the length of the spoken phrase.

It is therefore the object of the present invention to provide a method for digitally recording an analog audio signal in which the digitally recorded audio signals are automatically indexed.

The invention provides a method for digitally recording an analog audio signal with automatic indexing in which an analog audio signal containing audio information and signal pauses is read in, the analog audio signals are converted into digital audio data, with the audio data comprising audio information data and signal pause duration data, and the audio information data are stored as information data blocks and the signal pause duration data are stored as signal pause data blocks in a memory, the stored data blocks being read sequentially and a data structure for managing the indexing being produced or generated, any succession of information data blocks which is not interrupted by a signal pause with a pre-determined duration being detected as one cohesive audio information data sequence whose start and end are stored in the data structure for managing the indexing.

The invention also provides a method for digitally recording an analog audio signal with automatic indexing in which an analog audio signal containing audio information and signal pauses is read in, the analog audio signals are converted into digital audio data, with the audio data comprising audio information data and signal pause duration data, the converted audio data are stored, the stored audio data are read sequentially, with a decision being made regarding whether the read digital audio data are audio information data or signal pause duration data, and the audio information data are stored as information data blocks and the signal pause duration data are stored as signal pause data blocks in a memory, the stored data blocks being read sequentially and a data structure for managing the indexing being produced or generated, any succession of information data blocks which is not interrupted by a signal pause for a pre-determined duration being detected as one cohesive audio information data sequence whose start and end are stored in the data structure for managing the indexing.

An advantage of the invention is that the peak computation power required is lower because the decision regarding whether the audio data are audio information data or signal pause duration data does not need to be made in real time by the processor. Another advantage is that various different data post-processing methods or algorithms can be used alternatively on the stored audio data, and ultimately that algorithm which has the best result can be used.

In one preferred embodiment of the inventive method, the data structure produced for managing the indexing is an index table or an index list.

In one preferred embodiment of the inventive method, the digital audio data are compressed before storage.

In another preferred embodiment, each information data block contains an information data block identifier and audio information data, and each signal pause data block contains a signal pause data block identifier and signal pause duration data.

In accordance with one preferred embodiment of the inventive method, the start and end of a cohesive audio information data sequence are stored as start address for the first information data block and as end address for the last information data block within the memory in address pointers of the index table.

In another preferred embodiment of the inventive method, all the data blocks are of the same size and correspond to a particular basic unit of duration.

The basic unit of duration is preferably 30 ms.

In another preferred embodiment of the inventive method, a succession of information data blocks which is not separated by a signal pause data block whose signal pause duration data indicate a signal pause of more than 2 s is detected as one cohesive audio data sequence.

In accordance with another preferred embodiment of the inventive method, the sequentially read data blocks are subjected to data processing during production of the index table.

This affords the particular advantage that the data processing of the digitally recorded data blocks does not take place in real time while the analog audio signal is being read in, but instead the data blocks which have already been digitally stored are postprocessed, which means that a multiplicity of different data analysis methods and data manipulation methods can be carried out on the data blocks without needing to proceed in real time. This reduces the necessary computation power which must be provided for the digital data processing.

In another preferred embodiment of the inventive method, a succession of information data blocks between two signal pause data blocks is filtered out if the number of information data blocks does not exceed a minimum value and the signal pause of the two signal pause data blocks exceeds a particular first time limit value.

This affords the advantage that brief noise or crackle, i.e. audio signals of very short duration, between two signal pauses is removed during recording. This additionally affords a considerable improvement in the splitting into spoken phrases during indexing.

Preferably, the minimum value is 1, i.e. one information data block between two signal pause data blocks of predetermined duration is filtered out, while just two successive information data blocks situated between two signal pause data blocks are not filtered out.

This affords the advantage that only audio interference signals of very short duration are filtered out.

The signal pause data blocks' time limit value is preferably 0.5 s.

In another preferred embodiment of the inventive method, during the data processing, the signal duration data of signal pause data blocks whose signal pause duration exceeds a particular second time limit value are overwritten with signal duration data having a predetermined nominal signal duration.

Preferably, the second time limit value is 10 seconds and the nominal signal duration is 2 seconds.

This affords the particular advantage that, when turning over an analog cassette recorded on both sides for the purposes of digital recording, the long pause which inevitably arises in the process is transformed to a relatively short pause having the prescribed nominal signal duration of, for example, 2 seconds.

A preferred embodiment of the inventive method for digitally recording an analog audio signal with automatic indexing is described below with reference to the appended drawings in order to illustrate features which are fundamental to the invention.

In the drawings:

FIG. 1 shows a block diagram to illustrate a digital learning appliance in which the inventive method is carried out;

FIG. 2 shows a detail of the content of the digital learning appliance's digital memory shown in FIG. 1;

DETAILED DESCRIPTION

Figure 3:
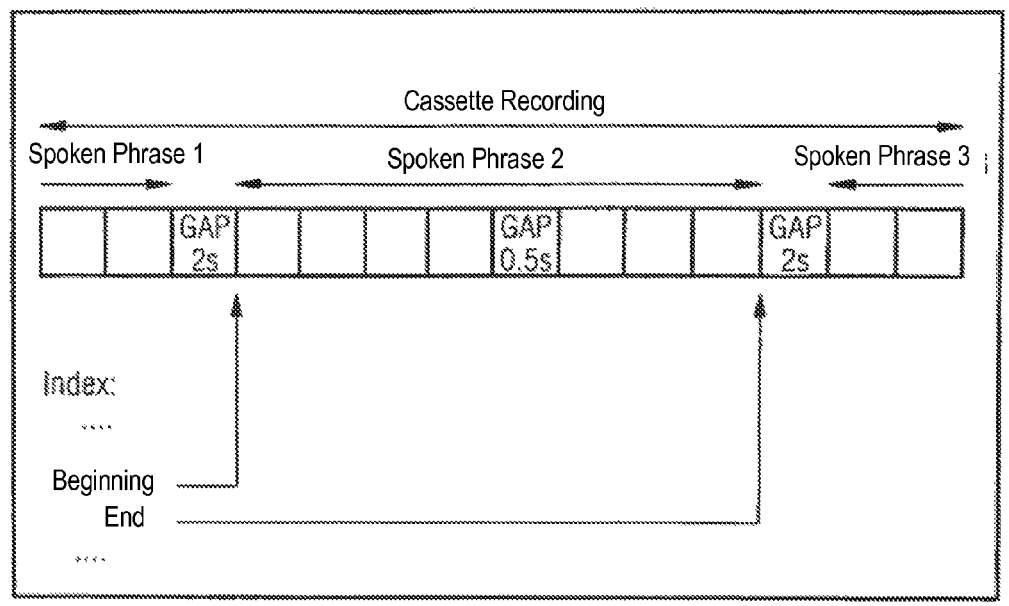
FIG. 3 shows an illustration to explain the formation of the index table in the inventive method.

FIG. 1 shows a digital learning appliance 1 in which the inventive method for digitally recording an analog audio signal with automatic indexing is carried out in accordance with the invention.

The digital learning appliance 1 contains an analog signal input 2 which is connected to an analog/digital converter 4 by means of a line 3. The analog/digital converter 4 is connected by means of a line 5 to a DSP processor 6 which is connected to a memory 8 by means of lines 7.

The analog signal input 2 of the digital learning appliance 1 can be connected to a conventional cassette player 10 by means of an analog line 9. The cassette player 10 contains a cassette drive into which an analog audio cassette 11 can be inserted. The digital learning appliance 1 additionally has a keypad (not shown) for operating it, loudspeakers and a power supply. The memory 8 is preferably a nonvolatile programmable memory, in particular a flash memory.

To carry out the inventive method, the person inserts the analog audio cassette 11, containing spoken phrases for learning a foreign language, for example, into the cassette drive of the cassette player 10 and plays the analog audio cassette 11.

The analog audio signal output by the cassette player contains audio information and signal pauses. The audio information is spoken information or music information. The analog audio signal is converted by the analog/digital converter 4 into digital audio data which comprise audio information data and signal pause duration data. The digital audio data are supplied via an internal line 5 to the DSP processor 6, which stores the audio information data as information data blocks and stores the signal pause duration data as signal pause data blocks in the memory 8, via the lines 7. The digital audio data are preferably subjected to data compression before storage in the memory 8.

Each stored information data block contains an information data block identifier I and audio information data. The stored signal pause data blocks for their part contain a signal pause data block identifier P and signal pause duration data.

FIG. 2 shows a detail of the memory 8 after storage of the audio information data.

In the example shown in FIG. 2, the shown memory detail of the memory 8 contains three information data blocks 8-1, 8-2, 8-3. The information data blocks each contain an information data block identifier I and audio information data AID.

A signal pause data block 8-4 has a signal pause data block identifier P and signal pause duration data SZD. Further information data blocks 8-5, 8-6, a signal pause data block 8-7 and further information data blocks 8-8, 8-9 and 8-10 are also shown.

The data blocks stored in this way are read sequentially by the DSP processor 6, and an index table is produced. In this context, any succession of information data blocks which are not interrupted by a signal pause having a predetermined duration is detected as one cohesive audio information data sequence. If the signal pause duration data SZD of the signal pause data block 8-4 indicate that the signal pause is below a predetermined minimum duration, for example 2 seconds, the succession of information data blocks 8-1, 8-2, 8-3 and the succession of information data blocks 8-5, 8-6 are detected as one cohesive audio information data sequence. A spoken phrase on a learning cassette contains short pauses in speech which result in short signal pauses. Such short signal pauses are suppressed when the index table is generated. The spoken phrase interrupted by a short pause in speech is nevertheless detected as a cohesive spoken phrase and is treated as one cohesive audio information data sequence when the index table is generated. When the index table is generated, the start and end of the cohesive audio information data sequence are preferably stored in a broad memory range of the memory 8 in an index table. In this context, the start of the cohesive audio information data sequence is preferably stored as a start address for the first information data block in a first address pointer of the index table, and the end of the cohesive audio information data sequence is stored as an end address for the last information data block within the memory in a second address pointer of the index table. The generated index table contains all the address pointers for the start and end addresses for all cohesive audio information data sequences, i.e. for all cohesive spoken phrases.

The stored data blocks, i.e. the information data blocks and the signal pause data blocks, are preferably of the same size, i.e. they take up the same memory space, and correspond to a particular predetermined basic unit of duration. In this context, the basic unit of duration can be set in one preferred embodiment. The basic unit of duration is preferably 30 ms.

FIG. 3 shows, schematically, the index table generation in the inventive method. A learning cassette contains a plurality of successive spoken phrases interrupted by relatively long pauses in speech of, for example, 2 seconds. In the example shown in FIG. 3, the spoken phrase 2 contains two words interrupted by a short pause in speech of 0.5 seconds. The spoken phrase 2 is "Good morning", for example, the first word of the spoken phrase 2 "Good" being separated from the second word "morning" of the spoken phrase 2 by a short pause in speech of 0.5 s.

When the index table is generated, despite the presence of the short pause in speech of 0.5 s, the spoken phrase 2 is detected as one cohesive spoken phrase or audio information data sequence whose start and end are stored in the index table.

When the index table is generated, in preferred embodiments of the inventive method, the sequentially read data blocks are subjected to data processing or postprocessing.

Figure 4:
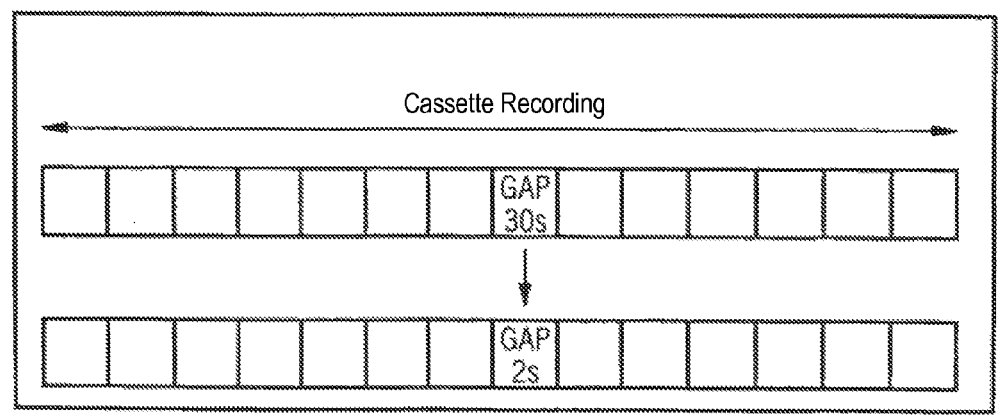
FIG. 4 shows an illustration to explain the data postprocessing for transforming long signal pauses into short signal pauses in accordance with the inventive method.

During the data postprocessing, it is possible, as shown by way of example in FIG. 4, for very long recorded signal pauses, which arise when the analog cassette is turned over in the drive of the cassette player 10, for example, to be transformed into signal pauses of predefined length. If, by way of preference, the recorded signal pause is longer than a particular time limit value of 10 seconds, the signal duration data of the appropriate signal pause data block are overwritten with a predefined nominal signal duration, which is 2 seconds, for example. In the example shown in FIG. 4, a signal pause of 30 seconds has been digitally stored, this signal pause having arisen by virtue of the analog learning cassette being turned over, for example. This unwanted long signal pause is transformed into a short signal pause of 2 seconds, because otherwise the person who is learning would need to wait 30 seconds for the next spoken phrase when using the digital learning appliance 30.

Figure 5:
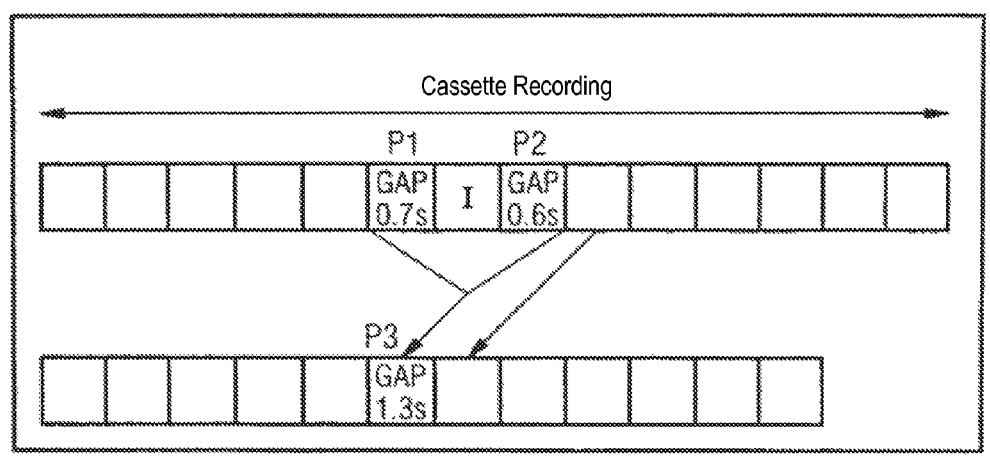
FIG. 5 shows an illustration to explain the data postprocessing for filtering out information data blocks between signal pause data blocks to remove audio noise in accordance with the inventive method.

The digital postprocessing in accordance with one preferred embodiment of the inventive method removes brief noise, such as crackle. FIG. 5 shows the removal of brief noise between two signal pauses by way of example. Preferably, a crackle or a brief pick-type noise is defined as a signal pause of at least 0.5 seconds in length followed by a single information data block followed, in turn, by a signal pause of at least 0.5 seconds in length. In the data postprocessing, the succession of information data blocks between two signal pause data blocks is filtered out if the number of information data blocks does not exceed a minimum value of 1 and the signal pause of the two signal pause data blocks situated in front and behind exceeds a particular time limit value of 0.5 s.

In one preferred embodiment of the inventive method, the minimum value and the time limit value can be set.

As shown in FIG. 5, an information data block I is surrounded by two signal pause data blocks P1, P2, the first signal pause data block having a signal pause duration of 0.7 seconds and the second signal pause data block P2 having a signal pause duration of 0.6 seconds. Between the two signal pause data blocks P1, P2 there is just one information data block, which is detected as noise or crackle, since the signal pause duration of the two adjacent signal pause data blocks P1, P2 both exceed the time limit value of 0.5 seconds.

The information data block I in FIG. 5 is filtered out or erased during the data processing, and the two signal pause data blocks P1, P2 are replaced by a new signal pause data block P3 whose stored signal pause duration is the sum of the two signal pause durations stored in the original signal pause data blocks P1, P2.

FIGS. 4 and 5 show, by way of example, two possible data postprocessing operations on the digitally stored data blocks, with postprocessing taking place after the entire cassette content has been digitally stored. The data postprocessing therefore need not take place in real time, which considerably reduces the circuit complexity for the digital learning appliance.

The inventive method can be used for any desired audio signals, i.e. both for voice signals and for music signals. The analog audio signal can be read in from any desired analog storage medium or can originate from the analog signal output of a signal processing appliance.

In one preferred embodiment, the cassette player 10 plays the analog cassette 11 at increased speed, with the playing speed being doubled, for example. The doubled playing speed is detected by the digital learning appliance, preferably when the analog audio signal played at increased speed is read in. The analog audio signal played at increased speed is digitally converted and is stored in data blocks such that the digitally stored audio signal is output at normal speaking speed for the person who is learning when the digital learning appliance is used. By way of example, speeded-up playing of the audio cassette is set or input by the operator using the keypad on the digital learning appliance 1.

In one alternative embodiment, the digital learning appliance 1 detects speeded-up playing of the audio cassette automatically.

The invention claimed is:

1. A method for digitally recording an analog audio signal, the method comprising:
    (a) receiving an analog audio signal played at an increased speed and containing audio information and signal pause information, wherein, when receiving the analog audio signal, a playing speed of a data medium on which the analog audio signal to be recorded is settable;
    (b) converting the analog audio signal played at an increased speed into a digital audio signal comprising audio information data and signal pause duration data;
    (c) storing the audio information data of the digital audio signal as information data blocks and the signal pause duration data of the digital audio signal as signal pause data blocks having different time durations in a memory, wherein each information data block contains an information data block identifier and audio information data, and each signal pause data block contains a signal pause data block identifier and signal pause duration data specifying a length of a pause between audio events, and the audio information data and the signal pause duration data represent outputs at a normal speaking speed;
    (d) generating a plurality of audio information data sequences by sequentially reading the information data blocks and the signal pause data blocks, the audio information data sequences being separated by the signal pause data blocks if an assigned time duration of the signal pause data block is higher than a predetermined time duration; and (e) producing an index table by sequentially reading the information data blocks and the signal pause data blocks.

2. The method of claim 1, wherein a start of an audio information data sequence is stored as start address for a first address pointer of the index table and an end of the audio information data sequence is stored as a second address pointer of the index table.

3. The method of claim 1, wherein producing the index table comprises processing the sequentially read data blocks.

4. The method of claim 3, further comprising, while processing the data, filtering out a succession of information data blocks between two adjacent signal pause data blocks if a number of information data blocks does not exceed a particular minimum value and the signal pause of the two adjacent signal pause data blocks exceeds a particular first time limit value.

5. The method of claim 4, wherein the minimum value is 1.

6. The method of claim 4, wherein the first time limit value is 0.5 seconds.

7. The method of claim 3, further comprising, while processing the data, overwriting signal duration data of signal pause data blocks whose signal pause duration exceeds a particular second time limit value with signal duration data having a particular nominal signal duration.

8. The method of claim 7, wherein the second time limit value is 10 seconds and the nominal signal duration is 2 seconds.

9. The method of claim 1, wherein the digital audio data are compressed before storage.

10. The method of claim 1, wherein all the data blocks are of a same size and correspond to a particular basic unit of duration.

11. The method of claim 10, wherein the basic unit of duration is 30 ms.

12. The method of claim 1, wherein a succession of information data blocks which is not separated by a signal pause data block whose signal pause duration data amount to a signal pause of more than 2 seconds is detected as an audio information data sequence.

13. A method for digitally recording an analog audio signal with automatic indexing, the method comprising:
  (a) receiving an analog audio signal played at an increased speed and containing audio information and signal pauses, wherein, when receiving the analog audio signal, a playing speed of a data medium on which the analog audio signal to be recorded is settable;
  (b) converting the analog audio signal played at an increased speed into digital audio data comprising audio information data and signal pause duration data specifying a length of a pause between audio events;
  (c) storing the converted digital audio data, such that the converted digital audio data represents an output at a normal speaking speed;
  (d) reading the stored digital audio data sequentially;
  (e) deciding whether the digital audio data are audio information data or signal pause duration data;
  (f) storing the audio information data as information data blocks and the signal pause duration data as signal pause data blocks in a memory; wherein each information data block contains an information data block identifier and audio information data, and each signal pause data block contains a signal pause data block identifier and signal pause duration data,
  (g) reading the stored data blocks sequentially in order to produce a data structure for managing the indexing, wherein a succession of information data blocks which is not interrupted by a signal pause with a pre-determined duration being detected as an audio information data sequence whose start and end are stored in the data structure for managing the indexing; and
  (h) producing an index table by sequentially reading the information data blocks and the signal pause data blocks.

14. The method of claim 13, wherein the data structure for managing the indexing is the index table.

15. The method of claim 14, wherein the start and end of an audio information data sequence are stored as start address for a first information data block and as an end address for a last information data block within the memory in address pointers of the index table.

16. The method of claim 14, further comprising, while processing the data, filtering out a succession of information data blocks between two adjacent signal pause data blocks if a number of information data blocks does not exceed a particular minimum value and the signal pause of the two adjacent signal pause data blocks exceeds a particular first time limit value.

17. The method of claim 16, wherein the minimum value is 1.

18. The method of claim 16, wherein the first time limit value is 0.5 seconds.

19. The method of claim 14, further comprising, while processing the data, overwriting the signal pause duration data of signal pause data blocks whose signal pause duration exceeds a particular second time limit value with signal duration data having a particular nominal signal duration.

20. The method of claim 19, wherein the second time limit value is 10 seconds and the nominal signal duration is 2 seconds.

21. The method of claim 13, wherein the digital audio data are compressed before storage.

22. The method of claim 13, wherein all the data blocks are of a same size and correspond to a particular basic unit of duration.

23. The method of claim 22, wherein the basic unit of duration is 30 ms.

24. The method of claim 13, wherein a succession of information data blocks which is not separated by a signal pause data block whose signal pause duration data amount to a signal pause of more than 2 seconds is detected as an audio information data sequence.

25. A method comprising:
  receiving an analog audio signal played at an increased speed and containing audio information and signal pauses, wherein, when receiving the analog audio signal, a playing speed of a data medium on which the analog audio signal to be recorded is settable;
  converting the analog audio signal played at an increased speed into digital audio data having audio information data and signal pause duration data, the signal pause duration data specifying a length of a pause between audio events;
  storing the audio information data as information data blocks in a memory, wherein the audio information data represents an output at a normal speaking speed, wherein each information data block contains an information data block identifier and audio information data;
  storing the signal pause duration data as signal pause data blocks in the memory, wherein the signal pause duration data represents an output at a normal speaking speed, wherein each signal pause data block contains a signal pause data block identifier and signal pause duration data;

sequentially reading the stored data blocks from the memory;
producing an index table by sequentially reading the information data blocks and the signal pause data blocks; and
storing a start address and an end address of a succession of information data blocks which is not interrupted by a signal pause with a pre-determined duration in the index table.

26. The method of claim 25, further comprising filtering out a succession of information data blocks between two adjacent signal pause data blocks when a number of information data blocks does not exceed a particular minimum value and the signal pause of each of the two adjacent signal pause data blocks exceeds a particular first time limit value.

27. The method of claim 26, further comprising overwriting the signal pause duration data of signal pause data blocks whose signal pause duration exceeds a particular second time limit value with signal pause duration data having a predetermined signal pause duration.

28. An apparatus comprising:
an analog audio signal input for receiving an audio signal played at an increased speed, wherein, when receiving the analog audio signal, a playing speed of a data medium on which the analog audio signal to be recorded is settable;
an analog-to-digital converter for converting the analog audio signal played at an increased speed into digital audio data having audio information data and signal pause duration data;
a memory configured to store audio information data of the digital audio data in information data blocks and to store signal pause duration data of the digital audio data in signal pause data blocks, wherein each information data block contains an information data block identifier and audio information data, and each signal pause data block contains a signal pause data block identifier and signal pause duration data specifying a length of a pause between audio events, and the audio information data and the signal pause duration data represent outputs at a normal speaking speed; and
a data processor configured to read sequentially the stored data blocks and the signal pause data block, and store a start address and an end address of a succession of information data blocks which is not interrupted by a signal pause with a first predetermined duration in an index table in the memory.

29. The apparatus of claim 28 wherein the data processor is further configured to filter out a succession of information data blocks between two adjacent signal pause data blocks when a number of information data blocks is less than a predetermined number and the signal pause of each of the two adjacent signal pause data blocks exceeds a predetermined time threshold.

30. The apparatus of claim 28 wherein the data processor is further configured to overwrite the signal phase duration data of signal pause data blocks whose signal pause duration exceeds a second predetermined duration with signal pause duration data having a third predetermined duration that is less than the second predetermined duration.

* * * * *